United States Patent
Atwood

(10) Patent No.: US 6,912,940 B1
(45) Date of Patent: Jul. 5, 2005

(54) CUTTING TABLE AND CLAMP FOR USE THEREWITH

(75) Inventor: Alan C. Atwood, Madison, WI (US)

(73) Assignee: Universal Presentation Concepts, Inc., Madison, WI (US)

( * ) Notice: Subject to any disclaimer, the term of this patent is extended or adjusted under 35 U.S.C. 154(b) by 451 days.

(21) Appl. No.: 09/693,408

(22) Filed: Oct. 19, 2000

Related U.S. Application Data

(60) Provisional application No. 60/160,273, filed on Oct. 19, 1999.

(51) Int. Cl.[7] .............................................. B26D 1/00
(52) U.S. Cl. .............................. 83/36; 83/209; 83/249; 83/282; 83/412; 83/462; 83/466
(58) Field of Search .......................... 83/466, 462, 35, 83/36, 457, 452, 151, 152, 153, 154, 249, 206, 267, 282, 704, 412; 29/24.5; 269/71, 126, 127, 128, 239

(56) References Cited

U.S. PATENT DOCUMENTS

| | | | | |
|---|---|---|---|---|
| 1,334,971 A | * | 3/1920 | Shore ....................... 269/71 X |
| 1,930,816 A | * | 10/1933 | Manxi ...................... 83/462 X |
| 2,264,162 A | * | 11/1941 | Hammer .................... 29/24.5 |
| 2,560,902 A | * | 7/1951 | Smith ......................... 269/22 |
| 4,336,926 A | * | 6/1982 | Inagaki et al. ............ 269/71 X |
| 4,361,062 A |   | 11/1982 | Reiff .......................... 83/76.9 |
| 4,462,443 A | * | 7/1984 | Allen ....................... 269/71 X |
| 4,639,987 A |   | 2/1987 | Georgopoulos ............. 29/24.5 |
| 4,681,305 A |   | 7/1987 | Green ........................ 269/139 |
| 4,702,137 A |   | 10/1987 | Davidson et al. ............. 83/718 |
| 5,072,494 A | * | 12/1991 | Graves et al. ............... 29/24.5 |
| 5,103,702 A | * | 4/1992 | Yannazzone .............. 83/452 X |
| 5,133,113 A |   | 7/1992 | Mueller et al. ............... 24/517 |
| 5,617,622 A |   | 4/1997 | Anderson ................... 29/281.3 |
| 5,694,823 A | * | 12/1997 | Westra et al. ............. 83/466 X |
| 5,725,205 A |   | 3/1998 | O'Berg ........................ 269/37 |
| 5,769,140 A |   | 6/1998 | Tuzmen ............... 160/168.1 R |
| 5,799,557 A |   | 9/1998 | Wang ........................ 83/639.5 |
| 5,806,394 A |   | 9/1998 | Marocco ....................... 83/197 |
| 5,816,126 A |   | 10/1998 | Pluber ......................... 83/167 |
| 5,826,317 A |   | 10/1998 | van Oostrom et al. ....... 29/24.5 |
| 5,927,172 A |   | 7/1999 | Wang .......................... 83/454 |
| 6,003,218 A | * | 12/1999 | Schumann et al. .......... 29/24.5 |
| 6,196,099 B1 | * | 3/2001 | Marocco .................. 29/24.5 X |
| 6,240,824 B1 | * | 6/2001 | Hsu ........................ 29/24.5 X |
| 6,334,379 B1 | * | 1/2002 | Sudano ........................ 83/452 |
| 6,336,388 B1 | * | 1/2002 | Marocco ................... 83/452 X |

\* cited by examiner

*Primary Examiner*—Charles Goodman
(74) *Attorney, Agent, or Firm*—DeWitt Ross & Stevens S.C.; Charles S. Sara

(57) ABSTRACT

A clamp is provided that is capable of restraining an item during cutting and rotating the item between cutting a first end of the item and cutting a second end of the item. The clamp includes an upper jaw, a lower jaw, and a backplate that pivotally connects the lower jaw and the upper jaw. The clamp includes a latch that restrains the lower and upper jaws against movement relative to one another. Also provided is an apparatus for cutting an item. The apparatus includes a table and the clamp described above. Optionally, the apparatus can also include a cutter for cutting the item.

22 Claims, 3 Drawing Sheets

CUTTING TABLE AND CLAMP FOR USE THEREWITH

CROSS-REFERENCE TO RELATED APPLICATIONS

This application claims priority under 35 USC §119(e) to U.S. provisional patent application Ser. No. 60/160,273, filed Oct. 19, 1999, the entirety of which is incorporated by reference herein.

FIELD OF THE INVENTION

The invention is generally directed to clamps for holding items, and more particularly to clamps for retaining items to be cut.

BACKGROUND OF THE INVENTION

Window blinds, referred to as Venetian blinds or miniblinds, are well-known window treatments. Generally, window blinds include a top header, slats or louvers, and a bottom header (also known as a footer). These pieces are usually held together with cords, strings, or the like. Manufacturers and retailers sell window blinds in various standardized sizes, with custom sizes available. However, custom-sized window blinds are costly. Furthermore, time is required to measure the window and to make the custom-sized blind, and then to deliver it to the consumer. To be cost-efficient, it is desirable to have the cutting process take less than four minutes.

Efforts at providing a faster and cost-effective way to generate custom-sized blinds have been made. In general, these devices first cut one side of a blind and then the other side, such that the end cords are symmetrically disposed with equal lengths of blind on either side of each end cord.

Some of the conventional cutting machines employ air cylinders for driving the cutters. The air cylinders automate the cutting of the blinds, thereby requiring less manual input from the user.

In conventional blind cutters, blinds are held in place in numerous ways. For example, some cutters have openings that fit the header, footer, and slats of the blind. Others use a clamp for fixing the blinds in position.

Examples of U.S. patents for machines that cut blinds include U.S. Pat. No. 5,799,557 to Wang, U.S. Pat. No. 5,816,126 to Pluber, U.S. Pat. No. 5,927,172 to Wang, and U.S. Pat. No. 5,806,394 to Marocco.

The conventional cutters are used in stores that sell blinds to consumers. Relatively unskilled workers perform the cutting. However, the workers using these cutters must be strong enough to lift and rotate the blind after a cut is made on the first side of the blind. Blinds can weigh up to thirty pounds. This heavy weight makes rotating the blinds a difficult task for many workers.

Furthermore, holeless blinds, such as the one described in U.S. Pat. No. 5,769,140 to Tuzmen, which lack cords that hold each slat in place, have recently been introduced into the market. Many of these holeless blinds have slats or blades that are free to move. This further complicates the rotating process that must be performed between cutting the two ends, because slats can slip out of the blind. Thus, rotation of blinds is difficult for many workers, with the accidental disassembly of blinds sometimes occurring. Reassembling a disassembled blind is difficult, if not impossible.

Moreover, a rotating clamp is useful for clamping and cutting additional items, such as louver packs (i.e., packages of blind slats), and materials made of wood, plastic, and the like.

SUMMARY OF THE INVENTION

The invention, which is defined by the claims set out at the end of this disclosure, is intended to solve at least some of the problems noted above. A clamp is provided that includes an upper jaw, a lower jaw, and a backplate. The lower jaw and the upper jaw are pivotally connected to the backplate. Also included in the clamp is a latch that restrains the lower and upper jaws against movement relative to one another. The clamp is capable of retaining an item to be cut, translating on the table, and rotating on an axis parallel to the plane of the table.

An apparatus for cutting an item to be cut is also provided. The apparatus includes a table and a clamp for retaining the item. The clamp is capable of translating on the table and rotating on an axis parallel to the plane of the table between cutting a first end of the item and cutting a second end of the item.

Also provided is a clamp that retains and rotates a window blind between cutting a first end of the window blind and cutting a second end of the window blind. The clamp is capable of translating on the table and rotating on an axis parallel to the plane of the table. The clamp includes an upper jaw, a lower jaw, and a backplate that pivotally connects the lower jaw and the upper jaw. The clamp includes a latch that restrains the lower and upper jaws against movement relative to one another. The clamp is capable of retaining a window blind, translating on the table, and rotating on an axis parallel to the plane of the table.

The invention also provides an apparatus for cutting a window blind. The apparatus includes a table and a clamp for retaining the window blind. The cutting table can also include a cutter for cutting a window blind. The cutter is disposed on the table. The apparatus has optional pull-out shelves for stabilizing the cut blinds while they are repackaged.

Further advantages, features, and objects of the invention will be apparent from the following detailed description of the invention in conjunction with the associated drawings.

DETAILED DESCRIPTION OF THE INVENTION

Figure 1:
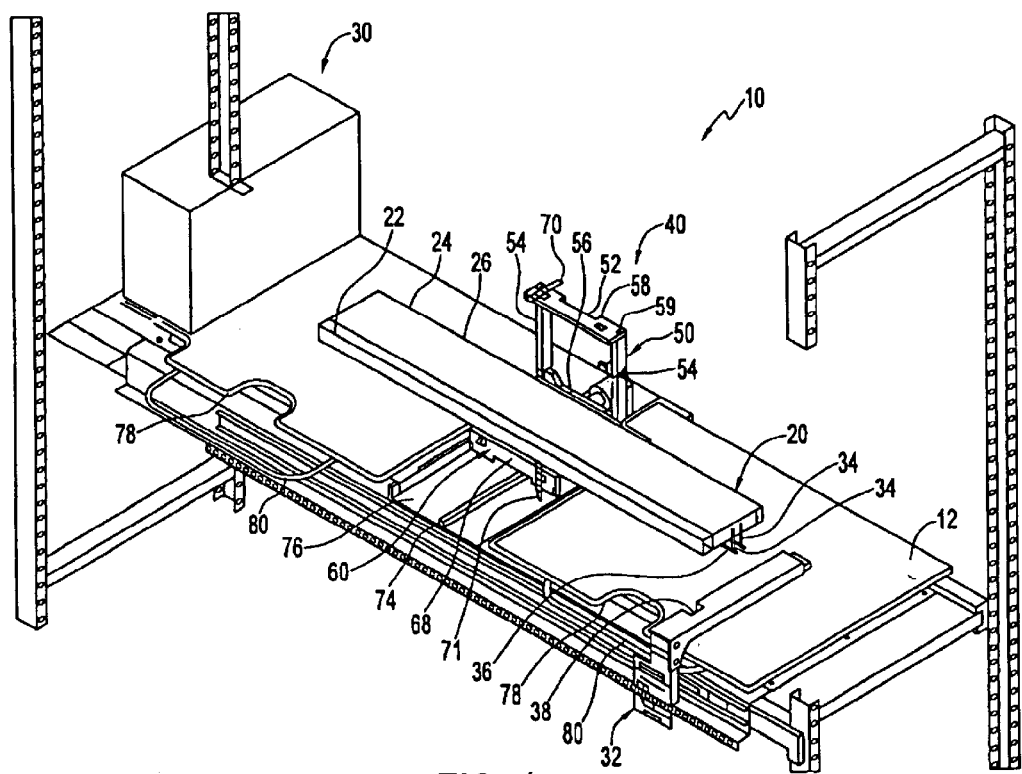
FIG. 1 is a perspective view of a preferred embodiment of the rotating clamp 40 with the rotating clamp 40 having a blind 20 inserted therein in a cutting position.

In the drawings, a preferred embodiment of an apparatus for cutting an item is illustrated in FIG. 1 at the reference numeral 10. The apparatus 10 is particularly useful in cutting window blinds 20, which typically include a header 22 that is attached to a frame of a window, a plurality of slats 24 that are typically strung together and attached to the header 22, and a footer 26 below the last slat 24.

The apparatus 10 has an upper surface 12 on which the clamping, aligning, and cutting takes place. The upper surface 12 of the apparatus 10 includes a cutter 30 on one end of the apparatus 10, a rotating clamp 40 in the middle of the apparatus 10, and an alignment assembly 32, which is preferably near the end opposite the cutter 30.

Figure 2:
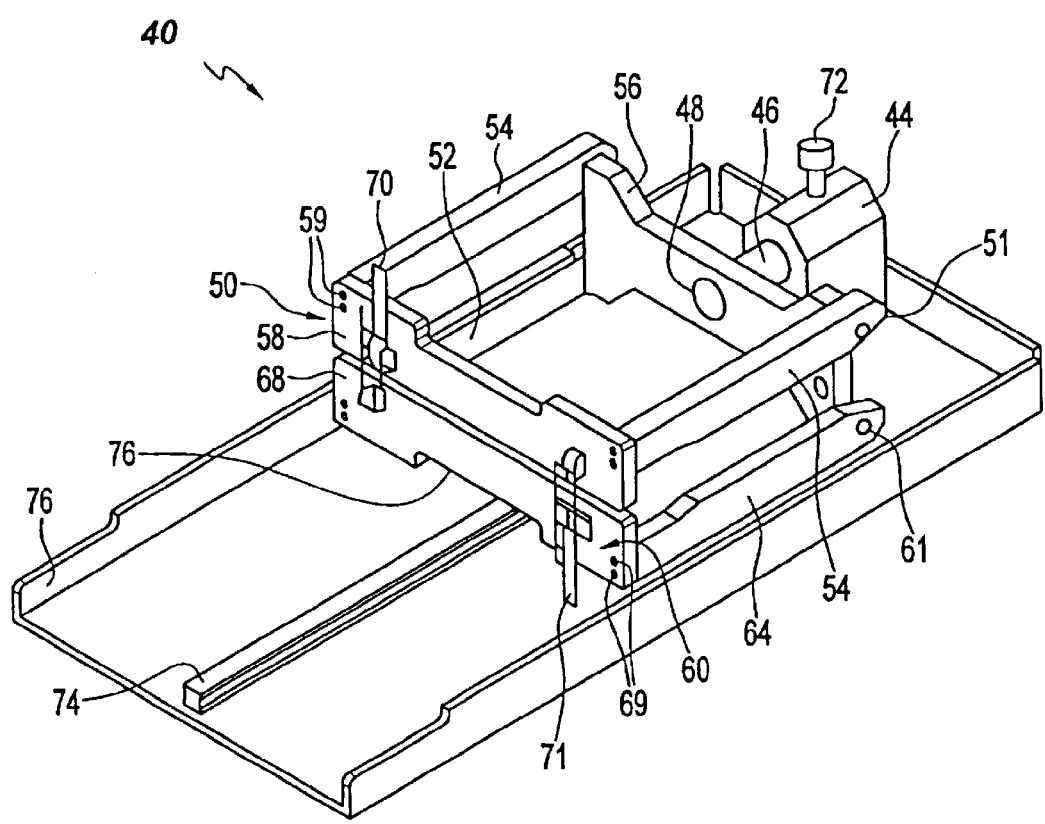
FIG. 2 is a perspective view of the rotating clamp 40 showing the details of the rotating clamp 40, mount 44, shaft 46, track 74, and tray 76.

As can be best seen in FIG. 2, the preferred embodiment of the rotating clamp 40 includes an upper jaw 50 and a lower jaw 60. The upper jaw 50 has two arms 54 that are fixedly attached by fasteners 59 to a front plate 58. The lower jaw 60 includes two arms 64 that are fixedly attached through fasteners 69 to a front plate 68. Arms 54 of upper jaw 50 and arms 64 of lower jaw 60 are connected to backplate 56 at pivots 51 and 61, respectively.

The preferred embodiment for the rotating clamp 40 employs two latches 70, 71. The latches 70, 71 are located on the front plate 58 of the upper jaw 50, and the front plate 68 of the lower jaw 60. The two latches 70, 71 retain and stabilize the blind 20 in the rotating clamp 40 by restraining the lower jaw 60 and upper jaw 50 against movement relative to one another.

Referring to FIG. 1, the rotating clamp 40 opens to receive a blind 20 to be cut. To open the rotating clamp 40, the latches 70, 71 are disengaged, and the upper jaw 50 is upwardly rotated away from the lower jaw 60. A blind 20 is placed in the rotating clamp 40. The rotating clamp 40 then is closed over the blind 20 by downwardly rotating upper jaw 50 toward lower jaw 60. Then, the rotating clamp 40 is secured by engaging latches 70, 71 thereby retaining the blind 20 in place. As detailed below, the rotating clamp 40 allows the blind 20 clamped therein to be rotated, preferably after the first side of the blind 20 has been cut.

Figure 3:
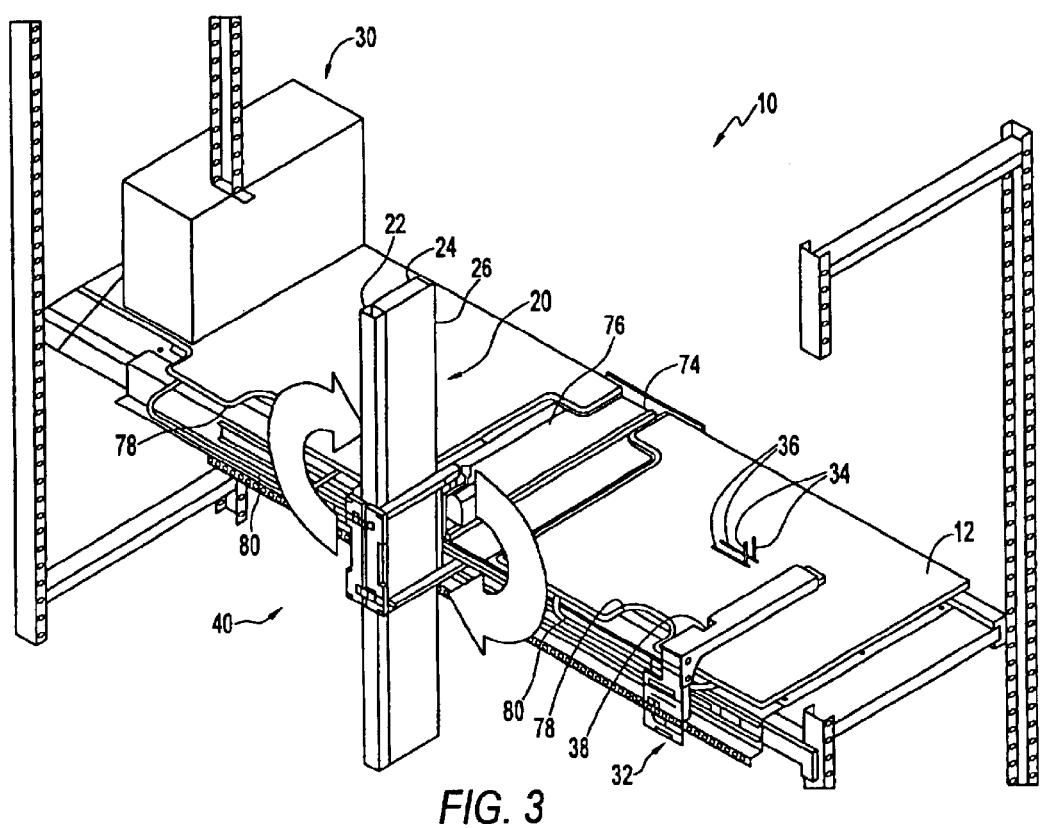
FIG. 3 is a perspective view of the preferred embodiment of the rotating clamp 40 with the rotating clamp 40 holding a blind 20 while the blind 20 is being rotated.

Referring to FIGS. 1 and 3, the apparatus 10 optionally includes alignment pins 34 on both sides of the rotating clamp 40. The alignment pins 34 are rotatably attached to the upper surface 12 of the apparatus 10 by hinges or the like (not shown) so that they may fold from a position parallel to the upper surface 12 of the apparatus 10 to a position perpendicular to the upper surface 12. The alignment pins 34 can be inserted into channels 36 of the upper surface 12 of the apparatus 10. When in an upright position, the alignment pins 34 provide a stop and further assist in the alignment of an item to be cut. When folded into channels 36, the alignment pins 34 are level with or below the surface 12 of the apparatus 10. As such, the alignment pins 34 do not interfere with the movement along the apparatus 10 of the item to be cut.

To further aid in aligning the blind 20, the apparatus 10 also includes alignment assembly 32, which includes header insert 38. After the blind 20 is placed in clamp 40, but before the upper jaw 50 is rotated toward the lower jaw 60, the alignment assembly 32 is moved toward the side of the blind 20 that is away from the cutter 30. The header 22 of the blind 20 can be inserted into the header insert 32. By holding the alignment assembly 32 against the side of the blind 20, the blind is aligned with the apparatus 10 and movement of the blind 20 is reduced or eliminated. Another benefit of the alignment assembly 32 is that when the alignment assembly 32 is pushed against the blind 20 (or vice versa) to align the edge of the blind 20, the blind 20 is cut straight. Once the blind 20 is aligned, the upper jaw 50 is rotated downwardly toward the lower jaw 60, and secured by latches 70, 71. Once the blind 20 is secured in the clamp 40, the alignment assembly 32 can be translated away from the blind 20.

Referring back to FIG. 2, the apparatus 10 also includes a mount 44 that has a shaft 46 that is fixed to the rotating clamp 40 at the backplate 56 at opening 48. The mount 44 slides along a track 74, which is attached to tray 76 of the apparatus 10. The track 74 permits the rotating clamp 40 to be translated on the upper surface 12 of the apparatus 10. Front plate 58 of upper jaw 50 and front plate 68 of lower jaw 60 have recesses 52, 62, respectively, that permit sliding of the clamp 40 over track 74. Preferably, shaft 46 is fixed to the mount 44, and the mount 44 slides over the track 74. Once the blind 20 is translated beyond the edge of the apparatus 10, a plunger 72 on the mount 44 is disengaged from the shaft 46 to permit rotation of the blind 20.

Preferably, the plunger 72 is spring loaded, although it need not be. The plunger 72 is used in conjunction with a shaft 46 having two holes (not shown) on opposites of the shaft 46. The two holes are located such that when the plunger 72 is inserted into them, the clamp 40 stops at a position that is parallel to the apparatus 10. Thus, when the plunger 72 is disengaged from the holes, the shaft 46 rotates freely. When the plunger 72 is inserted into one of the holes, the blind 20 is held in a fixed rotational orientation. The spring-loaded plunger 72 pushes the plunger 72 into the holes. This combination of the plunger 72 and the holes provides a way to lock the shaft 46 and clamp 40 in place after the clamp 40 is rotated 180°.

A preferred cutter 30 is described in U.S. Pat. No. 5,806,394. The cutter 30 is preferably at the opposite end of the apparatus 10 from the alignment assembly 32. Cutting can be performed by methods known to the art, such as those described in the above-mentioned patents, which are incorporated herein by reference for their description of cutting methods and devices. For example, cutting can be done with a single blade that slides and cuts the entire blind 20. Alternatively, multiple blade assemblies can be used, such as one with a separate blade for each of the top header 22, slats 24, and footer 26. Cutting can be manual, such as by a hand crank, or powered, such as by a cylinder stroke.

With the blind 20 placed in the cutter 30, the first side of the blind 20 is cut. FIGS. 1 and 3 show a blind 20 that is shortened such that the apparatus 10 can be seen. After the first side of the blind 20 is cut, the blind 20 is then rotated by disengaging the plunger 72 of the mount 44, which permits the rotating clamp 40 containing the blind 20 to be translated toward the edge of the apparatus 10. The translation is achieved by sliding the mount 44 along the track 70 of the upper surface 12 of the apparatus 10- or by other modes of translation previously noted.

Next, the rotating clamp 40 and the blind 20 secured therein are extended beyond the edge of upper surface 12 of the apparatus 10 as illustrated in FIG. 3. Then, the blind 20 is rotated about 180° such that the uncut end of the blind 20 now is on the side of the apparatus 10 that includes the cutter 30. The rotation of the clamp 40 is shown in FIG. 3 with arrows indicating the movement of the rotating clamp 40. After the blind 20 is rotated, the other side of the blind 20 is then cut. In general, equal lengths are cut from each side of the blind 20. After both sides of the blind 20 have been cut, the latches 70, 71 are disengaged, thereby releasing the blind 20.

As is illustrated in FIGS. 1 and 3, the apparatus 10 optionally includes recesses 78 through which optional shelves 80 can be accessed. The shelves 80 are pulled out from the apparatus 10 and remain fixed to the apparatus 10. Before the latches 70, 71 are released, the blind 20 is translated beyond the apparatus 10. After the latches 70, 71 are released, and the blind 20 is moved onto the shelves 80, which hold the blind 20 while the blind 20 is repackaged.

The rotating clamp 40 can be used with any apparatus 10, including, but not limited to, those described in the patents listed above. For example, the rotating clamp 40 can be used with a home workbench.

In addition, the rotating clamp 40 can be used to clamp and cut a variety of items such as louver packs (i.e., packages of blind slats), and materials made of wood, plastic, and the like. For example, the rotating clamp 40 can be used to clamp and cut PVC pipe, gutters, and lumber.

It is understood that while description of the rotating clamp 40 refers to an upper jaw 50 and a lower jaw 60, once rotated, the upper jaws will then be below the lower jaw 60, and vice versa. It is also understood that the rotating described above could take place in other orientations and directions. For example, the shaft 46, mount 44, and clamp 40 could be in a horizontal plane (as described above) or in a vertical plane. Likewise, the cutting, rotating, and other operations could take place in other orientations and directions. For example, the cutting can take place in the horizontal plane or the vertical plane. The cutting can be accomplished by the downward movement of a cutting blade toward the blind 20 or by the horizontal translation of a cutting blade toward the blind 20.

It is also understood that the various preferred embodiments are shown and described above to illustrate different possible features of the invention and the varying ways in which these features may be combined. Apart from combining the different features of the above embodiments in varying ways, other modifications are also considered to be within the scope of the invention. Certain preferred options follow.

First, the upper jaw 50 and lower jaw 60 can be of unitary construction. For example, instead the upper jaw 50 consisting of a front plate 58 and two arms 54, the upper jaw 50 could consist of one U-shaped piece.

Second, the upper jaw 50 and the lower jaw 60 can be directly connected to each other, as opposed to having both the upper jaw 50 and the lower jaw 60 connected to the backplate 56.

Third, the latch 70 can be a single latch, multiple latches, or any similar latching device. If multiple latches 70, 71 are employed, one can be located on the upper jaw 50 and the other on the lower jaw 60. Alternatively, the latches 70, 71 can both be on the same jaw.

Fourth, as noted above, the clamp 40 described herein can also cut louver packs, which are packages of blind slats 24. The packs may be aligned with alignment assembly 32. Pins 34 and channels 36 are particularly useful for aligning louver packs.

Fifth, other methods can be used to translate the rotating clamp 40. For example, the shaft 46 can be a telescoping shaft that telescopically elongates to permit the translation of the rotating clamp 40 on the upper surface 12 of the apparatus 10.

Sixth, the plunger 72 can be replaced with a different mechanism for locking the shaft 46 and clamp 40 in place after the clamp 40 is rotated 180°. For example, a male and female connector can be used, with one located on the mount 44 (or a fastener connected to the mount 44) and the other located on the shaft 46. Other examples include, but are not limited to, a threaded fastener that pushes against the shaft 46 to prevent rotational movement, a latch, and a bolt.

The invention is not intended to be limited to the preferred embodiments described above, but rather is intended to be limited only by the claims set out below. Thus, the invention encompasses all alternate embodiments that fall literally or equivalently within the scope of these claims.

What is claimed is:

1. An apparatus for positioning window blinds to be cut, comprising:
    (a) a table having an upper surface;
    (b) a tray fixed to the upper surface of the table;
    (c) a clamping mechanism for holding the window blinds;
    (d) a track fixed to the tray;
    (e) a mount, slidably adjoining and moveable along the track, having a rotatable shaft connected to the clamping mechanism, the rotatable shaft having an axis of rotation parallel to the track; and
    (f) a moveable plunger fixed to the mount for engaging the rotatable shaft and preventing shaft rotation.

2. The apparatus of claim 1 wherein the track has a terminal end abutting an edge of the table surface and the clamping mechanism is conveyable along the surface of the table to the terminal end.

3. The apparatus of claim 1 wherein the clamping mechanism comprises:
    (a) a backplate connected to the rotatable shaft;
    (b) an upper jaw pivotally connected to the backplate and having an upper front plate;
    (c) a lower jaw pivotally connected to the backplate and having a lower front plate; and
    wherein the upper plate is moveable to a clamp-closed position relative to the lower plate for defining an item-restraining-area between the upper jaw and the lower jaw.

4. The apparatus of claim 3 further comprising an upper jaw first arm and an upper jaw second arm connecting the upper front plate to the backplate.

5. The apparatus of claim 1 wherein the rotatable shaft includes:
    (a) a first hole;
    (b) a second hole positioned on the shaft one-hundred-eighty degrees relative the first hole; and
    wherein the first hole is engaged with the plunger for locking the clamping mechanism in a first orientation and the second hole is engaged with the plunger for locking the clamping mechanism in a second orientation one-hundred-and-eighty degrees relative the first orientation.

6. A window blind cutting apparatus having:
    (a) a first tray having a planar surface terminating at a planar edge;
    (b) a linear track fixed to the planar surface and having a first terminal and a second terminal, the second terminal proximate the planar edge;
    (c) a mount slidably adjoining the track;
    (d) a clamp having a backplate, an upper jaw, and a lower jaw, wherein the upper jaw and lower jaw are pivotally connected to the backplate and the clamp is rotatably connected to the mount; and
    wherein the mount is moveable along the track to a first position proximate the first terminal having the planar surface of the tray obstructing rotation of the clamp and to a second position proximate the second terminal having the clamp positioned beyond the planar edge of the first tray and rotatable about an axis parallel to the planar surface of the first tray.

7. The cutting apparatus of claim 6 for use in cutting a blind assembly enclosed in the clamp and having a first edge, further having:
    (a) a table supporting the first tray;
    (b) a cutting apparatus; and
    (c) an alignment assembly for aligning a first edge of the blind assembly with the cutting apparatus.

8. The cutting apparatus of claim 7 wherein the table has at least one packaging tray for use in packaging the blind assembly.

9. The cutting apparatus of claim 6 wherein a cylindrical shaft, having at least a first hole, connects the mount to the clamp and the mount comprises a plunger for engagement with the at least first hole.

10. The cutting apparatus of claim 9 wherein the back plate is connected to the cylindrical shaft.

11. The cutting apparatus of claim 6 wherein the track comprises one rail.

12. The cutting apparatus of claim 10 wherein the upper jaw comprises a first unitary U-shaped upper jaw component and the lower jaw comprises a second unitary U-shaped lower jaw component.

13. The cutting apparatus of claim 6 wherein the clamp comprises at least one latch for releasably securing the upper jaw to the lower jaw in the closed position.

14. An apparatus for use in securing and positioning window blinds to be cut, comprising:

(a) a tray;

(b) a clamp comprising:

(c) a backplate;

(d) an upper jaw pivotally connected to the backplate;

(e) a lower jaw pivotally connected to the backplate;

(f) at least a first latch fixed to the clamp for releasably securing the upper jaw to the lower jaw;

(g) a track fixed to the tray;

(h) a mount adjoined to and moveable along the track;

(i) a shaft secured to the backplate and rotatably connected to the mount; and wherein the upper jaw is pivotable to a first position relative the lower jaw for receiving an article and pivotable to a second position relative the lower jaw for securing an article to the apparatus.

15. The apparatus of claim 14 further comprising a table for supporting the tray and a cutting device fixed to the table.

16. The apparatus of claim 15 further comprising means for aligning the article relative to the cutting device.

17. The apparatus of claim 15 wherein the table comprises shelves for supporting the article.

18. The apparatus of claim 14 wherein the shaft is a telescoping shaft.

19. The apparatus of claim 14 wherein the article is a plurality of homogeneous items.

20. The apparatus of claim 14 wherein the table includes pins and channels providing guidance for aligning the items.

21. A method for cutting window blinds having a first end and a second end opposite the first end, comprising the steps of:

(a) positioning and aligning the article relative to a cutting apparatus;

(b) securing the positioned and aligned article with a clamp at a first location and in a first orientation, the clamp having a backplate, an upper jaw, and a lower jaw, wherein the upper jaw and lower jaw are pivotally connected to the backplate;

(c) cutting, with the cutting apparatus, the first end of the article at the first location;

(d) moving the clamp to a second location;

(e) flipping the clamp and article one-hundred-eighty degrees about a horizontal axis;

(f) returning the article to the first location; and (g) cutting the second end of the article with the cutting apparatus.

22. The method of claim 21 wherein the clamp comprises an upper jaw, a lower jaw, and a latch, further comprising the steps of:

(a) pivoting the upper jaw from a clamp open position to a clamp closed position relative to the lower jaw; and (b) latching the clamp closed for securing the article.

* * * * *